United States Patent
Donzis et al.

(10) Patent No.: US 6,973,097 B1
(45) Date of Patent: Dec. 6, 2005

(54) MODIFYING MESSAGE SIZE INDICATIONS IN COMMUNICATIONS OVER DATA NETWORKS

(75) Inventors: Lewis T. Donzis, San Antonio, TX (US); Earnest E. Hughes, San Antonio, TX (US)

(73) Assignee: Nortel Networks Limited, St. Laurent (CA)

( * ) Notice: Subject to any disclaimer, the term of this patent is extended or adjusted under 35 U.S.C. 154(b) by 1021 days.

(21) Appl. No.: 09/668,786

(22) Filed: Sep. 22, 2000

Related U.S. Application Data

(60) Provisional application No. 60/228,646, filed on Aug. 29, 2000.

(51) Int. Cl.[7] .............................................. H04J 3/16
(52) U.S. Cl. ................................. 370/470; 370/395.52
(58) Field of Search ................................ 345/473, 710, 345/765; 370/229, 232, 252, 300, 351, 352, 370/354, 356, 389, 395.1, 395.52, 401, 412, 370/442, 443, 470, 472, 473, 476, 493, 522; 375/346; 455/3.05, 403, 426, 556; 705/26, 705/14; 709/203, 217, 219, 224, 227, 250; 710/72; 725/106

(56) References Cited

U.S. PATENT DOCUMENTS

| 6,161,141 A * | 12/2000 | Dillon ........................ 709/230 |
| 6,424,657 B1 * | 7/2002 | Voit et al. .................... 370/412 |
| 2002/0071436 A1 * | 6/2002 | Border et al. .......... 370/395.32 |

OTHER PUBLICATIONS

J. Mogul & S. Deering, Path MTU Discovery, Nov. 1990, Internet Engineering Task Force, RFC1191.*

L. Mamakos, K. Lidl, J. Evarts, D. Carrel, D. Simone & R. Wheeler, A Method for Transmitting PPP Over Ethernet (PPPoE), Feb. 1999, Internet Engineering Task Force, RFC2516.*

L. Mamakos et al., Network Working Group Request for Comments: 2516, *A Method for Transmitting PPP Over Ethernet(PPPoE)*, pp. 1-11 (1999).

Jason John Schwarz, Ethernet Tutorial, Jason John Schwarz, pp. 1-4, dated at least as early as Sep. 17, 2000.

Juha Heinanen, Network Working Group Request for Comments:1483, *Multiprotocol Encapsulation Over ATM Adaption Layer 5*, pp. 1-15 (Jul. 1993).

J. Mogul, Network Working Group Request for Comments: 1191, *Path MTU Discovery*, pp. 1-18 (Nov. 1990).

S. Deering et al., Network Working Group Request for Comments: 2460, *Internet Protocol, Version 6 (IPv6) Specification*, pp. 1-37 (Dec. 1998).

W. Simpson, Network Working Group Request for Comments: 1661, *The Point-to-Point Protocol(PPP)*, pp. 1-50 (Jul. 1994).

(Continued)

*Primary Examiner*—Wellington Chin
*Assistant Examiner*—John Shew
(74) *Attorney, Agent, or Firm*—Trop, Pruner & Hu, PC

(57) ABSTRACT

A communications system includes a data network that is coupled to an access system, which enables access to the data network by a client system. The client system issues requests through a router and the access system, with the requests specifying a server system as the destination. The server system sends response messages back to the client system through the data network and the router. The router is capable of modifying an indication of the maximum size of at least a portion of a message. This ensures that response messages communicated by the server system are not too large that the access system is unable to handle the response messages.

40 Claims, 6 Drawing Sheets

OTHER PUBLICATIONS

Information Sciences Institute, *Internet Protocol, Darpa Internet Program Protocol Specification*, Request for Comments: 791, pp. 1-49 (Sep. 1981).

Charles Homig, Network Working Group Request for Comments: 894, *A Standard for the Transmission of IP Datagrams over Ethemet Networks*, pp. 1-3 (Apr. 1984).

Information Sciences Institute, *Transmission Control Protocol, Darpa Internet Program Protocol Specification*, Request for Comments: 793, pp. 1-82 (Sep. 1981).

Marc Boucher, *mssclampfw intro*, Kemel Module Source Code, pp. 1-6, Rebel.com (Jan. 8, 2000).

* cited by examiner

MODIFYING MESSAGE SIZE INDICATIONS IN COMMUNICATIONS OVER DATA NETWORKS

CROSS REFERENCE TO RELATED APPLICATIONS

This application claims the benefit under 35 U.S.C. 119(e) of U.S. Provisional Application Ser. No. 60/228,646, entitled "Method and Apparatus for Reducing the Need for Packet Fragmentation in a Solicited Response Stream," filed Aug. 29, 2000.

TECHNICAL FIELD

This invention relates to communications over data networks.

BACKGROUND

Packet-based data networks are widely used to link various types of network elements, such as personal computers, servers, network telephones, Internet appliances, and so forth. Examples of data networks include private networks (such as local area networks or wide area networks) and public networks (such as the Internet). Common forms of communications between network elements across packet-based data networks include electronic mail, file transfer, web browsing, and other exchanges of data. More recently, with the increased capacity and reliability of packet-based data networks, audio communications (such as voice communications), video communications (such as video conferencing), and other forms of real-time interactive or streaming communications are becoming more common over packet-based data networks.

Typically, the interface of a network element to a network is made up of several layers, including a physical layer, a data link layer, a network layer, a transport layer, and higher layers. The physical layer includes the electrical and mechanical interface to the physical communications medium that makes up the network. The data link layer, which sits above the physical layer, is typically responsible for the delivery of data (in one or more frames) to the communications medium. One example of a data link layer is an Ethernet layer, which is commonly used in many local area networks (LANs). The network layer sits above the data link layer, and is responsible for the switching and routing of a connection between nodes and for dividing data into packets for communications. One example of a network layer is an Internet Protocol (IP) layer. The transport layer sits above the network layer and manages the end-to-end connection for error recovery and flow control. One example of a transport layer is a Transmission Control Protocol (TCP) layer.

An Ethernet frame includes a destination address, a source address, payload data, and a cyclic redundancy check (CRC) field (for error detection). If the network layer is implemented as an IP layer, then the payload of the Ethernet frame carries an IP packet, which includes an IP header, a header associated with the transport layer (e.g., a TCP header), and a payload section. The payload section of the IP packet is used to carry data associated with higher-level protocol layers or applications.

When a source IP host has a certain amount of data to send to a destination IP host, the data is transmitted as a series of IP packets. For improved efficiency, the size of each IP packet is set to the maximum size that can be handled by routers along the path from the source to the destination. This packet size is referred to as the path maximum transmission unit (PMTU). The source IP host is capable of discovering the PMTU of a path. This is done by using the Don't Fragment (DF) bit in the IP header, and sending the IP packet with the known MTU of its first hop (or router). The packet is forwarded to downstream routers without fragmentation, with a router that is unable to handle the advertised PMTU discarding the packet and returning an ICMP (Internet Control Message Protocol) Destination Unreachable message. The lower MTU of the router returning the error message is included in the Destination Unreachable message. In this manner, the source IP host can adjust the PMTU to a lower value.

Using the technique described a source IP host relies on receipt of the error message (in the form of the Destination Unreachable message). If the source IP host does not receive the error message, which may occur if some nodes along a path are not configured properly, then the source IP host will assume that the path is capable of handling its initially set PMTU. The source IP host will then attempt to send (and re-send) packets using the PMTU that are too large for some routers along the path to handle. The result is continued retransmission of a packet (with the intended destination node not receiving the packet) on a periodic basis because the source IP host has not received an acknowledgement of a successful transmission or an error message indicating a problem in the transmissions. Consequently, valuable bandwidth is consumed in the unnecessary transmission of packets and a delay is experienced at the source terminal in obtaining a desired response from the destination terminal. Although "black hole" detection may be performed to detect such a condition, many nodes are not configured to perform such detection.

A need thus exists for an improved method and apparatus to avoid communicating messages that are too large to handle by some nodes along a communications path.

SUMMARY

In general, according to one embodiment, a system comprises a controller adapted to receive a first message containing a data portion and an indication of a size for the data portion. The controller is adapted to further modify the indication to indicate a different size for the data portion.

Some embodiments of the invention may have one or more of the following advantages. By modifying the indication of a size of a data portion to a value that can be handled along a communications path, more reliable communications of messages can be achieved. Network bandwidth is enhanced by reducing the frequency of communications in which messages are transmitted and retransmitted a number of times due to message data portion sizes being too large, especially if a reliable mechanism for returning error messages is not available. Communications delays are reduced by reducing the frequency of transmission of messages with data portions that are too large for routers to handle.

Other or alternative features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although reference is made to the Ethernet protocol, Internet Protocol (IP), or Transmission Control Protocol (TCP) in described embodiments, some or all of such protocols may be substituted with other protocols in further embodiments.

Figure 1:
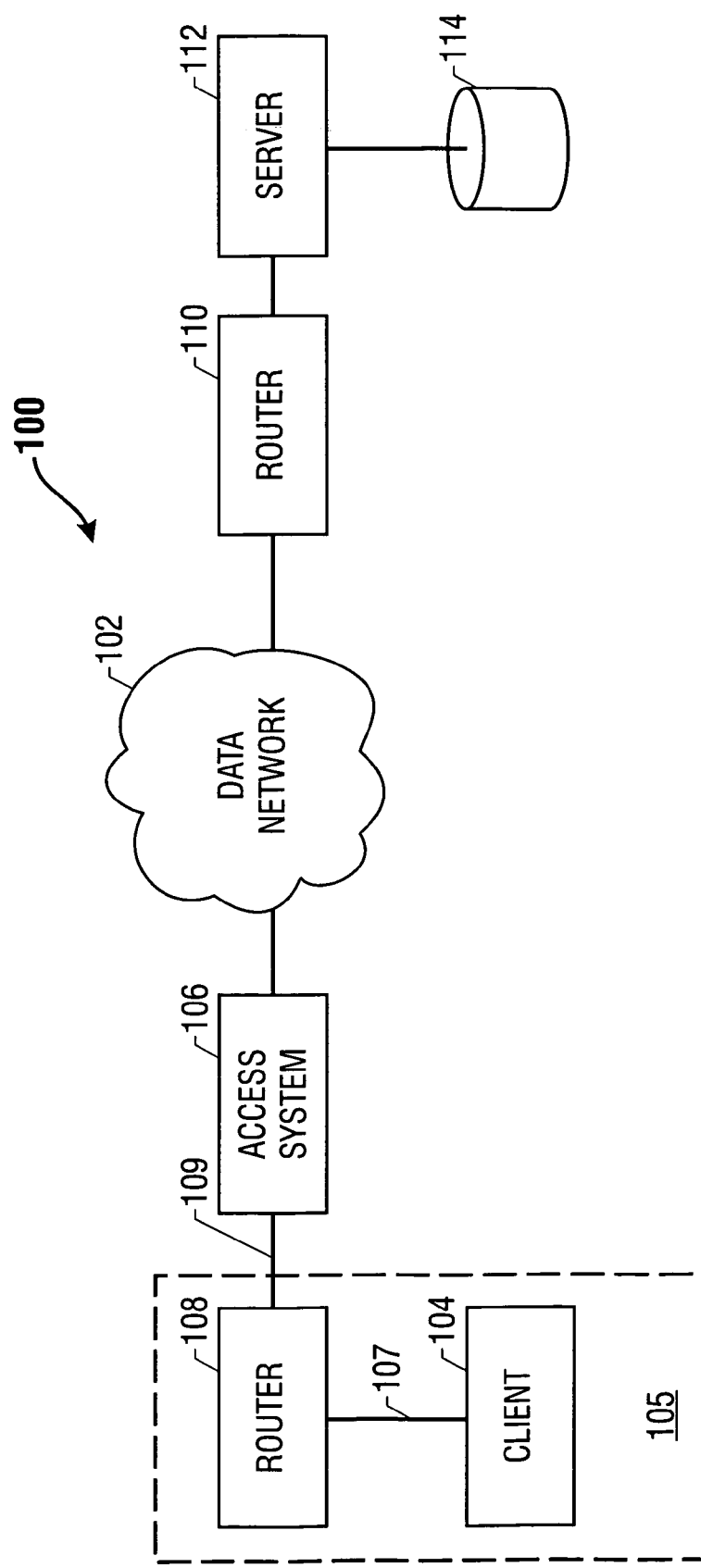
FIG. 1 is a block diagram of an embodiment of a communications system.

Referring to FIG. 1, an example communications system 100 includes a data network 102 that is coupled to various network elements. The data network 102 in one embodiment is a public network such as the Internet. Alternatively, the data network 102 may be other types of networks. In the example of FIG. 1, a client system 104 is coupled over a local area network (LAN) 107 to a router 108. The client system 104, LAN 107, and router 108 are part of a community 105 (e.g., a home office). The router 108 is coupled over a link 109 to an access system 106, which enables access between the community 105 and the data network 102. Another network element coupled to the data network 102 is a server system 112, which communicates with the data network 102 through a router 110. Although not shown, the data network 102 also includes one or more routers to route messages between network elements.

The server system 112 contains, or is capable of accessing, a database 114 that includes information that a user at the client system 104 may wish to access. For example, the server 112 may be a web server associated with a search engine, an e-commerce retailer, and so forth. In response to requests from the client system 104 that are communicated through the intermediate routers and the data network 102, the server system 112 accesses requested information in the database 114 and returns the information back to the client system 104.

In one arrangement, the LAN 107 is an Ethernet network as defined by the Institute of Electrical and Electronics Engineers (IEEE) 802.3 Standard. The link 109 can also be an Ethernet network, or alternatively, the link 109 can also be another type of network.

For various purposes, including access control and billing functions, it may be desirable to establish a point-to-point link between the router 108 and the access system 106. The Point-to-Point Protocol, described in RFC 1661, entitled "The Point-to-Point Protocol (PPP)," dated July 1994, provides a standard method for transporting multi-protocol packets over point-to-point links. However, an Ethernet network, such as the link 109, provides for a multi-point relationship that is incompatible with setting up point-to-point links between two peers. To enable a point-to-point link between the router 108 and the access system 106, a Point-to-Point over Ethernet (PPPoE) protocol is used. PPPoE is described in RFC 2516, entitled "A Method for Transmitting PPP Over Ethernet (PPPoE)," dated February 1999.

A network layer protocol used by the various network elements shown in FIG. 1, including the client system 104, routers 108 and 110, and server system 114, is the Internet Protocol (IP), as described in Request for Comments (RFC) 791, entitled "Internet Protocol," dated September 1981. Another version of IP is IPv6, as described in RFC 2460, entitled "Internet Protocol, Version 6 (IPv6) Specification," dated December 1998. In further embodiments, other types of packet-based network layer protocols may be employed.

With some versions of Ethernet and IP, the maximum length of an IP packet carried in the payload section of an Ethernet frame is 1,500 bytes. For optimal throughput performance, full-length IP packets (if intermediate routers are capable of handling the size) are employed to send data between nodes. The limit of 1,500 bytes for the maximum length of an IP packet is reduced when certain lower-level communications protocols are employed. One such communications protocol is the PPPoE protocol. If PPPoE is employed, the payload section of the Ethernet frame carries, in addition to the IP packet, control fields associated with PPP and PPPoE. Due to the presence of PPP and PPPoE control fields, the maximum length for IP packets is reduced from 1,500 to 1,492 bytes, since the PPP and PPPoE protocols require 8 bytes of control information.

Although PPPoE is employed between the router 108 and the access system 106 (referred to as the PPPoE endpoints), the client system 104 may be unaware that PPPoE is being employed. As a result, the client system 104 assumes that the maximum IP packet of 1,500 bytes is supported and thus sends a maximum message size indication advertising this capability. If this maximum message size indication is forwarded to a remote system, such as the server system 112 or another system, then the server system 112 will respond with IP packets of 1,500 bytes, which the access system 106 will be unable to handle.

In accordance with some embodiments of invention, to avoid the server system 112 responding with IP packets with the maximum length of 1,500 bytes, the router 108 (or another router along the path between the client system 104 and the server system 112) modifies the maximum message size indication to a smaller value. As a result, when the server system 112 receives a request from the client system 104, the server system 112 knows about the reduced maximum length and sends response IP packets of the appropriate size (e.g., 1,492 bytes). Although the described embodiments refer to maximum sizes of 1,500 and 1,492 bytes, other embodiments may specify larger or smaller maximum values.

In further embodiments, some other communications protocol besides PPPoE may be used over the link 109 which requires some amount of control information that may displace the available payload portion in a frame (e.g., an Ethernet frame) for carrying messages (e.g., IP packets). In such further embodiments, the router 108 can similarly modify the maximum message size indication to account for the reduced payload portion in a frame.

Figure 2:
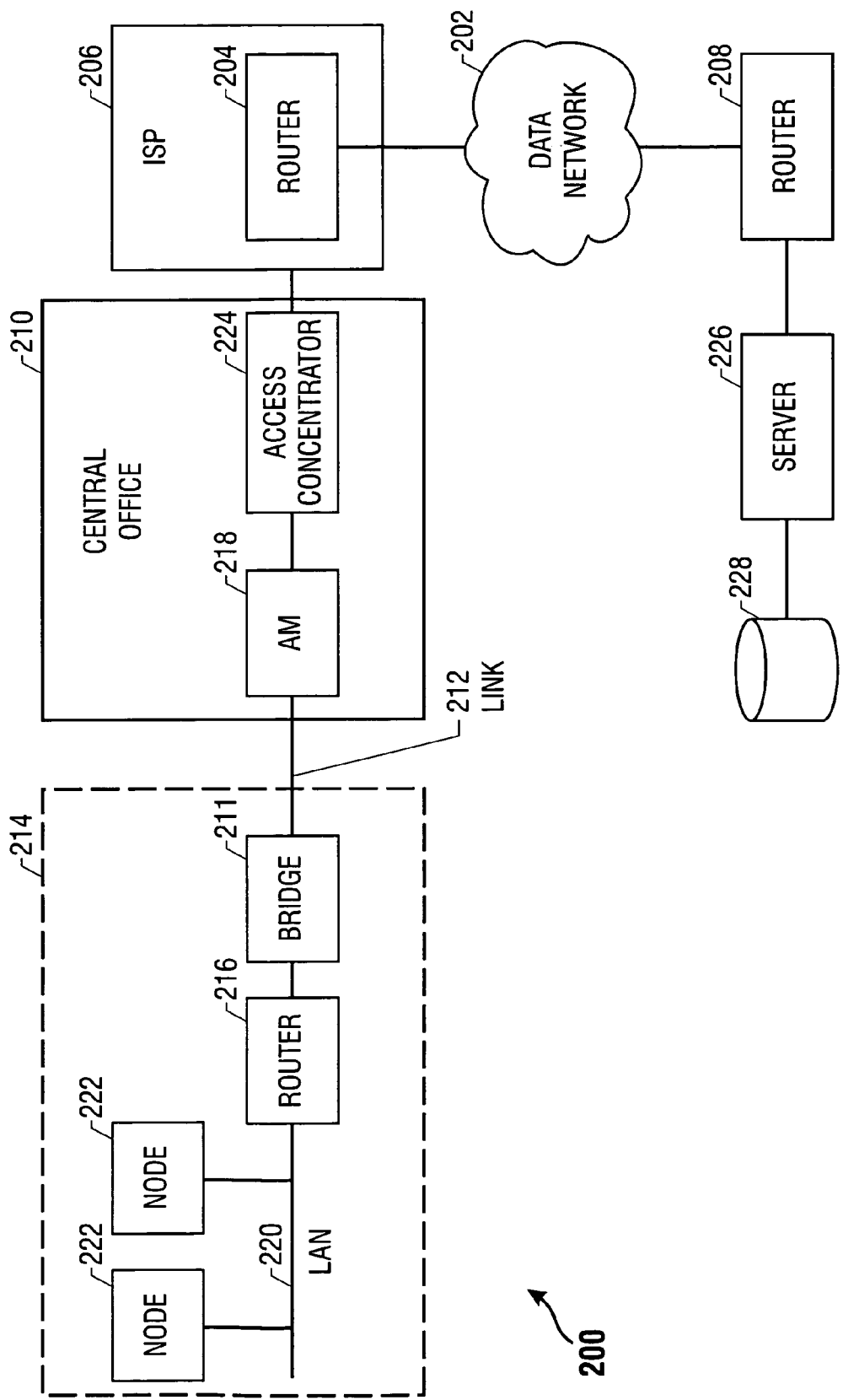
FIG. 2 is a block diagram of another embodiment of a communications system.

Referring to FIG. 2, an alternative embodiment of a communications system 200 includes a data network 202. The data network 202 is connected to a router 204 (that in the illustrated example is part of an Internet Service Provider or ISP system 206) and to a router 208. The ISP system 206 is connected to a central office system 210 operated by a local exchange carrier (LEC), usually a telephone company. The central office system 210 provides access to the data network 202 through the ISP 206 (or one of plural ISPs). In one arrangement, the ISP system 206 may be part of the central office system 210 and operated by the same LEC, or alternatively, the ISP system 206 may be operated by an entity other than the LEC operating the central office system 210.

The central office system 210 is connected over a link 212 to a community 214, which includes a bridge 211, a router 216, and a LAN 220 coupled to plural nodes 222. One example of the link 212 is an XDSL (digital subscriber line) link. Other types of links may also be used in further embodiments, such as an Ethernet link, ISDN (Integrated Services Digital Network) link, T1 link, or other link.

The central office system 210 includes an access module 218 (e.g., a DSL access module or DSLAM) that provides the interface to the link 212. The central office system 210 also includes an access concentrator 224 to provide a PPPoE endpoint to the community 214 and to perform dynamic service selection of one of plural ISPs to employ for access to the data network 202.

Each of the nodes 222 in the community 214 is capable of accessing the data network 202 through the LAN 220, router 216, bridge 211, central office system 210, and ISP system 206. Various resources are accessible over the data network 202, including resources contained in the server system 226. The server system 226 is associated with a database 228, which stores information that may be of interest to users of the nodes 222.

The LAN 220 in one embodiment is an Ethernet network. The bridge 211 converts Ethernet frames received from the router 216 into messages that are capable of being communicated over the link 212. For example, if the link 212 is an ADSL link, then the Ethernet frames can be encapsulated into messages of a predetermined format, such as cells according to the Asynchronous Transfer Mode (ATM) protocol, as set by the International Telegraph and Telephone Consultative Committee Communications (CCITT) Standards Organization. The cells when received by the access module 218 are decapsulated into Ethernet frames for processing by the access concentrator 224. A similar process is performed in the reverse direction from the access concentrator 224 to the router 216. However, if the link 212 is an Ethernet network, then the bridge 211 is not needed.

In the example arrangement of FIG. 2, PPPoE can be used to establish a point-to-point link between the router 216 and the access concentrator 224. An Ethernet frame carrying PPP and PPPoE control fields is communicated between the router 216 and the access concentrator 224 (with intermediate encapsulation/decapsulation performed if needed for communication over the link 212).

As in the system 100 of FIG. 1, each of the nodes 222 when advertising a maximum message size will advertise that it is capable of communicating the full-length 1,500 bytes. However, this is not the case in frames communicated between the router 216 and the access concentrator 224 because of the presence of PPP and PPPoE control fields. In accordance with some embodiments, the router 216 modifies the advertised maximum message size indication to a lower value so that a remote system responding to a request from one of the nodes 222 communicates packets having the reduced message size. The maximum length of the IP packet carried in the payload section of the Ethernet frame is reduced from 1,500 bytes to 1,492 bytes.

Figure 3:
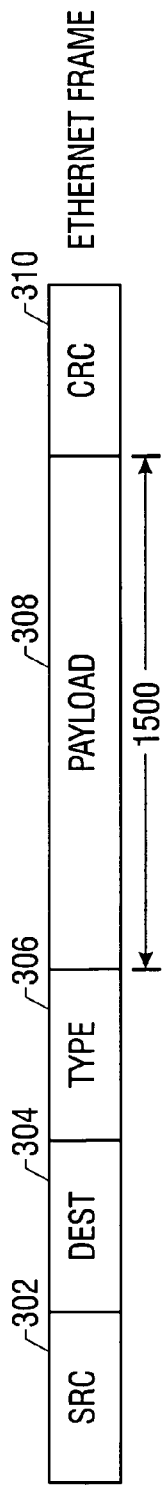
FIG. 3 illustrates an Ethernet packet.
Figure 4:
FIG. 4 illustrates an Internet Protocol (IP) packet.

Referring to FIG. 3, an Ethernet frame 300 is illustrated. The Ethernet frame 300 includes a source address section 302, a destination address section 304, an Ether-type section 306, a payload section 308, and a CRC (cyclic redundancy check) section 310. The payload section 308 is capable of carrying an IP packet, such as a packet 400 illustrated in FIG. 4. The IP packet includes an IP header 402, a transport protocol (e.g., TCP) header 404, and a data portion 406. TCP is described in RFC 793, entitled "Transmission Control Protocol," dated September 1981.

Typically, the maximum length of the IP packet 400 that can be carried in the payload section 308 of the Ethernet frame is 1,500 bytes. However, if a lower-level communications protocol such as PPPoE is employed, the maximum length of the IP packet 400 that can be carried in the payload section 308 of the Ethernet frame 300 is reduced.

Figure 5:
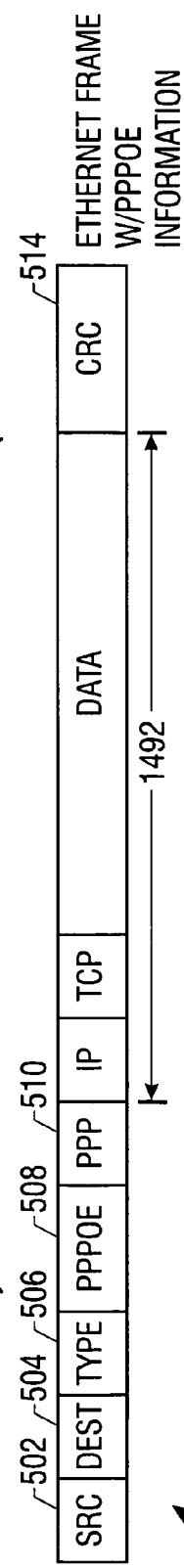
FIG. 5 illustrates an Ethernet frame that carries an IP packet and control fields associated with a Point-to-Point (PPP) protocol and a Point-to-Point over Ethernet (PPPoE) protocol.

Contents of an Ethernet frame 500 that contains PPPoE information is illustrated in FIG. 5. The Ethernet frame 500 contains a source address section 502, a destination address section 504, an Ether-type section 506, and a payload section 512, and a CRC section 514. The payload section 512 contains a PPPoE control field 508 (six bytes long in one example), a PPP control field 510 (two bytes long in one example), and an IP packet. The maximum length of the IP packet is reduced from the full length by the length required to carry the control fields 508 and 510. In one embodiment, the length of the control fields 508 and 510 is 8 bytes, so that the maximum length for the IP packet is 1,492 bytes.

Figure 6:
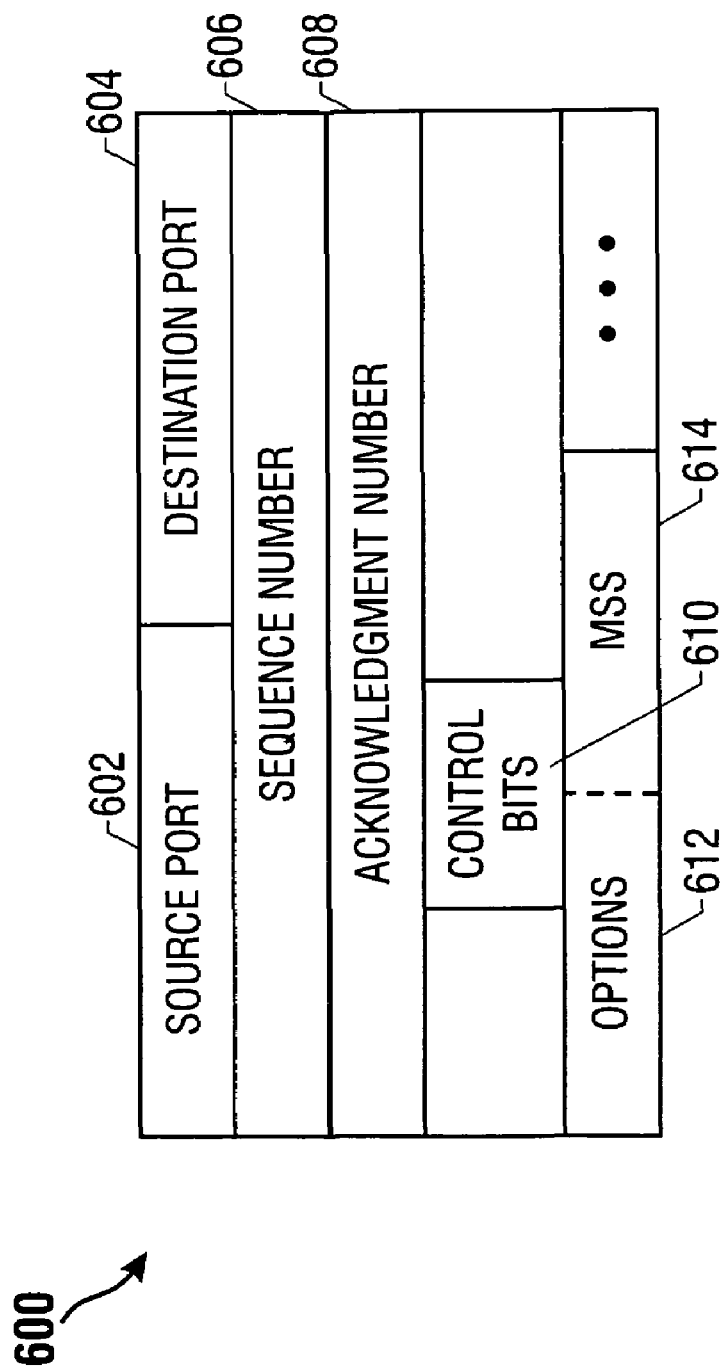
FIG. 6 illustrates a Transmission Control Protocol (TCP) header.

Referring to FIG. 6, a TCP header 600 is illustrated. The TCP header includes a source port 602 (associated with the source terminal) and a destination port 604 (associated with the destination terminal). The TCP header 600 also includes a sequence number 606 and an acknowledgement number 608. The sequence number 606 is used to identify where in a sequence a current packet is located in an established connection between the source terminal and the destination terminal. The acknowledgment number 608 indicates the next sequence number the sender of the segment is expecting to receive.

The TCP header 600 also includes control bits 610, which include an ACK flag (which when active indicates that the acknowledgment number 608 is significant) and an SYN flag (which when active sets the initial sequence number). The TCP header 600 also includes an options field 612, which contains, among other items, a maximum segment size (MSS) field 614. The MSS field 614 communicates the maximum receive segment size at the TCP port sending the segment. Typically, the value of the MSS field 614 is derived from the path maximum transmission unit (PMTU), which is the maximum size of an IP packet that routers along a predetermined path can handle. The MSS value is equal to the MTU value less 40 bytes, which is the size of the IP header and the TCP header.

Basically, the MSS field 614 advertises the maximum segment size of the data portion 406 (FIG. 4) of an IP packet 400 that can be received by the source terminal. If the predetermined maximum length of an IP packet is 1,500 bytes, then the MSS field 614 has the value 1,460 bytes. If the maximum length is 1,492 bytes, then the MSS field 614 has the value 1,452 bytes. Again, although values of 1,460 and 1,452 are used as examples in the described embodiments, further embodiments can utilize other values.

Figure 7:
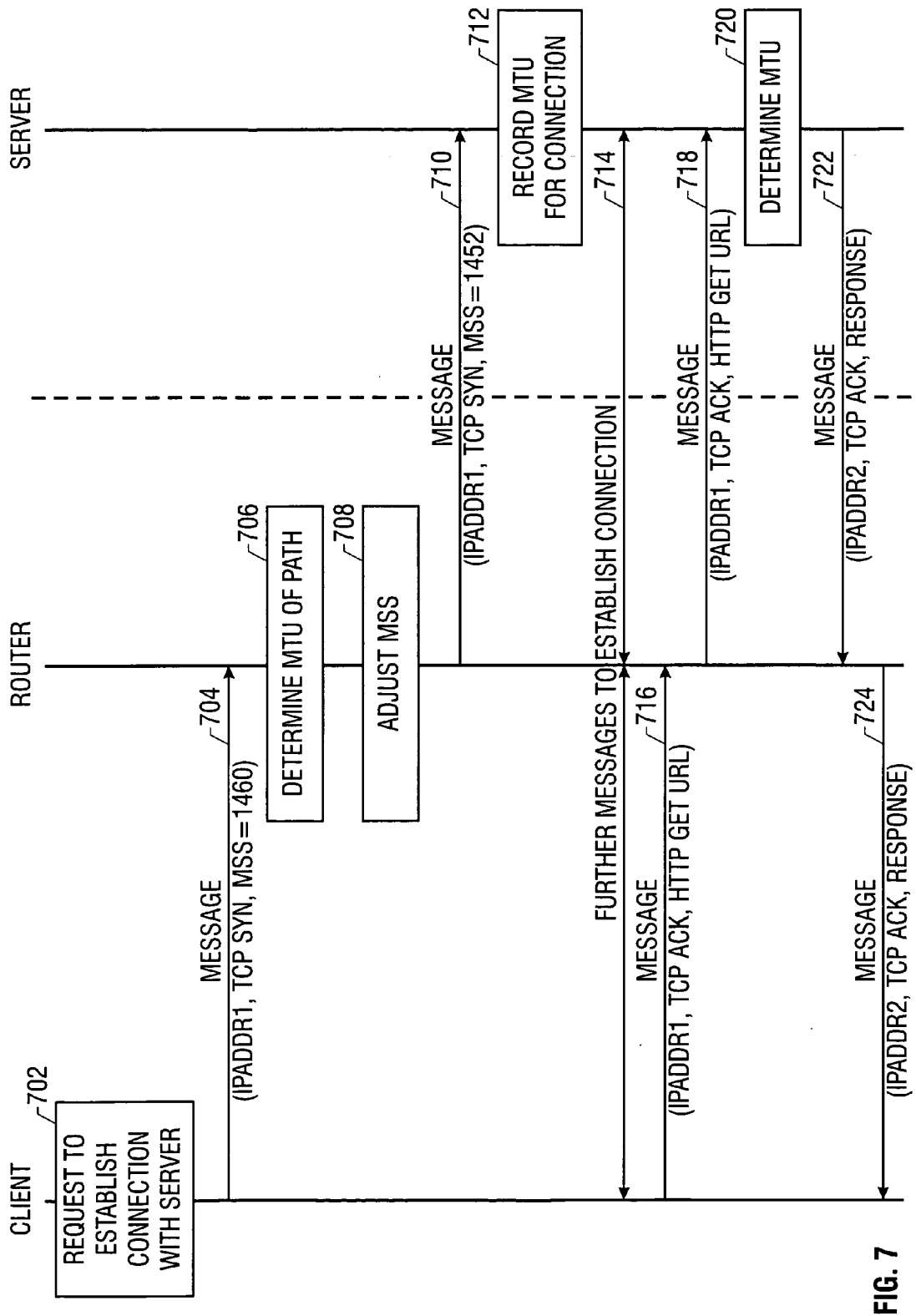
FIG. 7 is a message flow diagram illustrating actions performed by, and messages exchanged between, a client system, a router, and a server system in the communications system of FIG. 1 or 2.

Referring to FIG. 7, an example flow of messages exchanged between, and actions performed by, a client system (e.g., element 104 in FIG. 1 or 222 in FIG. 2), a router (e.g., element 108 in FIG. 1 or 216 in FIG. 2), and a server system (element 112 in FIG. 1 or 226 in FIG. 2) are illustrated. Additional nodes may be present between the router system and the server system but have been omitted in this example for the sake of clarity. Such omitted nodes are represented by the dashed line.

In response to requests received (at 702) to establish a connection with the server system, the client system sends a message (at 704) to the router. The message sent at 704 includes the IP address of the server system (IPADDR1), with the TCP SYN flag set to the active state (to establish a connection) and the MSS value set at 1460 (which corresponds to the full length MTU of 1,500 bytes). The MSS value may be set at a lower value, but in many instances the maximum MSS value is used if possible to enhance data communications throughput.

Although the router uses the PPPoE protocol for a point-to-point link with an access system (e.g., element 106 in FIG. 1 or 210 in FIG. 2), the client system is not configured with PPPoE components. As a result, the MSS value advertised by the client system can be the full-length value of 1,460 bytes.

Upon receiving the message with the SYN flag set to the active state, the router determines (at 706) the MTU of the downstream path over which the message is to be further communicated. The determined path MTU (PMTU) is then used to compute the corresponding MSS value. The computed MSS value is compared to the MSS value contained in the message received from the client system. If the computed MSS value is less than the MSS value contained in the message, then the message MSS value is adjusted (at 708) to the lower value. The computed MSS value is at most 1,452 because the router uses PPPoE to communicate messages to the access system. Thus, if the MSS value in the message is set at the full-length value of 1,460, then the message MSS value is decreased by the router to 1,452 to provide the extra eight bytes to carry PPPoE and PPP control fields. If a lower computed MSS value is derived, then the message MSS value is decreased to the lower value.

The message transmitted by the router (at 710) includes the address of the server system (IPADDR1), with the TCP SYN flag set to the active state, but with the MSS values set at 1,452 (or a lower value based on the computed MSS).

When the server system receives the message, it extracts the MSS value and derives the MTU for the source system (in this case, the router). This MTU is recorded (at 712) for the connection. Further protocol messages are exchanged between the client system and the router and between the router and the server system (at 714) to establish the connection.

Once the connection is established, the client system can issue requests to the server system. For example, the client system can send (at 716) a request message that includes the server's IP address (IPADDR1), with the TCP ACK flag set to the active state. The request message also contains a payload section that contains the request, which in one example is in the form of an HTTP (Hypertext Transport Protocol) GET request. A Uniform Resource Locator (URL) is contained in the HTTP GET request to specify the resource in the server system that is desired by the client system. The router receives the message and forwards (at 718) the message (with the destination address IPADDR1, the TCP ACK flag in the active state, and the HTTP GET URL request) to the server system. Upon receipt of the request, the server system retrieves the data, and determines (at 720) the MTU of the connection. It then packages the response in a packet with a size that can be handled based on the derived MTU. The message is then sent (at 722) from the server system back to the router, with the message containing the address of the client system (IPADDR2), the TCP ACK flag set at the active state, and the response data. If the router has a network address translator to perform many-to-one address translation, then the address IPADDR2 may be the address of the router, with the router performing the necessary address translation to derive the address of the client system. The router then forwards the message (at 724) to the client system.

By modifying the advertised MSS value received from the client system, the router system ensures that when the server system responds to a client response, the response is carried in packets each with a size that can be handled by the access system and the router. As a result, more reliable communications can be achieved and unnecessary transmissions of packets that are too large for a communications path can be avoided or reduced.

Figure 8:
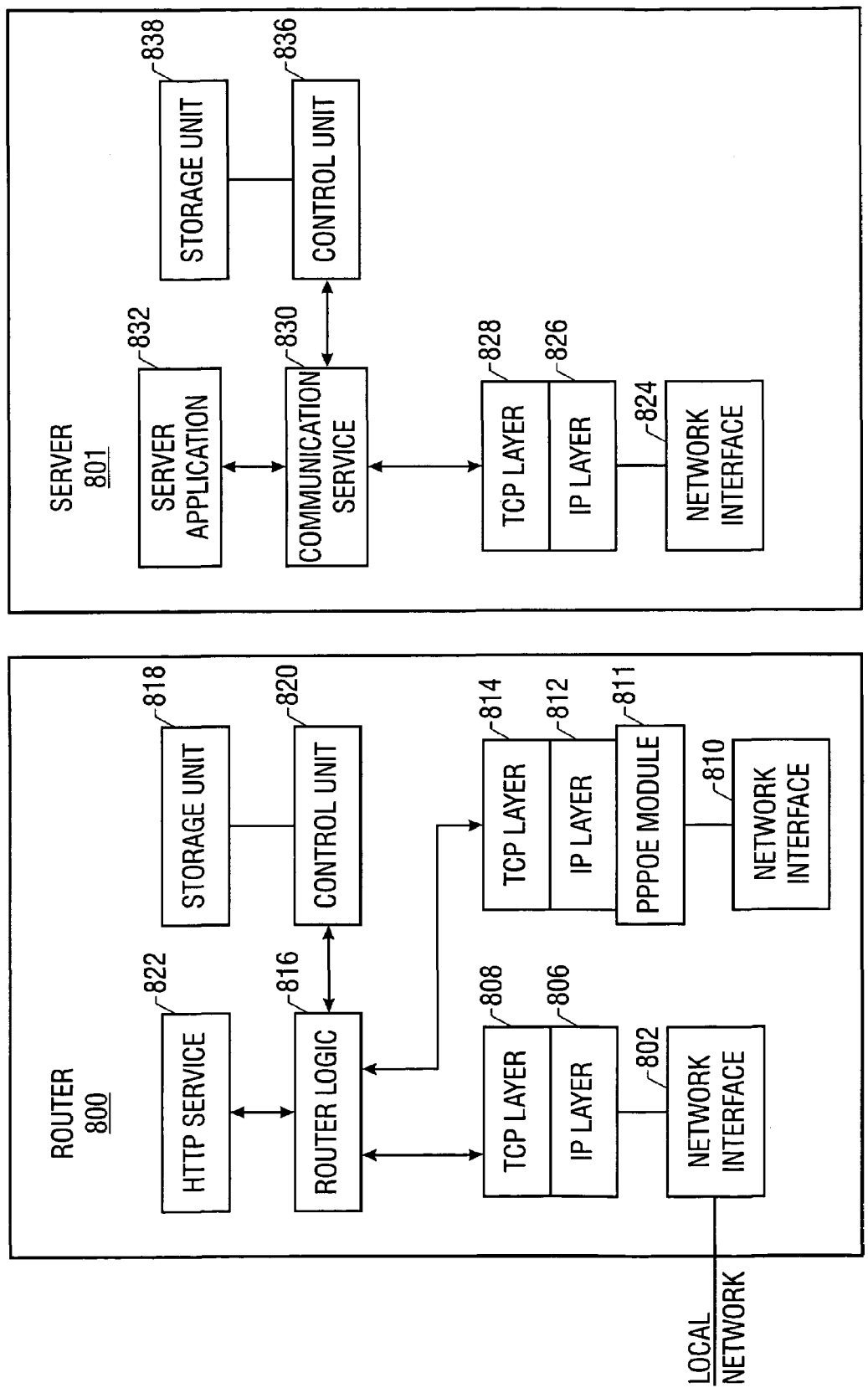
FIG. 8 is a block diagram of the router system and server systems of FIG. 7, in accordance with an embodiment.

Referring to FIG. 8, components of a router 800 (which can be one of the routers 108 in FIGS. 1 and 216 in FIG. 2) and a server system 801 (which can be one of the server systems 112 in FIGS. 1 and 226 in FIG. 2) are illustrated. The router 800 includes a first network interface 802 coupled to a local area network. In one example, the network interface 802 implements the Ethernet protocol. Above the network interface 802 are an IP layer 806 and a TCP layer 808. Packets received through the network interface 802 are routed through the TCP and IP layers to router logic 816 (which may be implemented in hardware and/or software). Transmission of data from the router logic 816 to the local area network is performed in the reverse direction through the TCP and IP layers and the network interface 802.

The router logic 816 routes packets between the local area network and an external network (which in the arrangements of FIGS. 1 and 2 is the link to the access system 106 or 210). A second network interface 810 is coupled to the external network. Above the second network interface 810 are a PPPoE module 811, an IP layer 812, and a TCP layer 814. Other protocol layers, stacks, or modules may also be present in the router 800 depending on the type of external network used.

The router 800 also includes a control unit 818 connected to a storage unit 820. In addition, an HTTP service 822 enables the generation of HTTP requests and the processing of incoming HTTP responses. If software routines or modules are present in the router 800, such software routines or modules are executable on the control unit 818.

The server system 801 also includes a network interface 824, as well as an IP layer 826 and a TCP layer 828. A communications service 830 controls the communications of data over the connected network. In one arrangement, the communications service 830 is capable of receiving HTTP requests and sending HTTP messages. The communications service 830 is coupled to a server application 832, which accesses data in the database 114 (FIG. 1) or 228 (FIG. 2) in response to requests received from a remote client. The server system 801 also includes a control unit 836 and a storage unit 838. Software routines or modules, such as the server application 832 and communications service 830, are executable on the control unit 836.

Instructions of the various software routines or modules discussed above may be stored on one or more storage units in the corresponding nodes and loaded for execution on corresponding control units. The control units include microprocessors, microcontrollers, processor cards (including one or more microprocessors or microcontrollers), or other control or computing devices. As used here, a "controller" refers to hardware, software, or a combination thereof.

The storage units may include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact disks (CDs) or digital video disks (DVDs). Instructions that make up the various software routines or modules in a node and stored in a respective storage unit when executed by a control unit cause the corresponding node to perform programmed acts.

The instructions of the software routines or modules are loaded or transported into the node in one of many different ways. For example, code segments including instructions stored on floppy disks, CD or DVD media, a hard disk, or transported through a network interface card, modem, or other interface device may be loaded into the node and executed as corresponding software routines or modules. In the loading or transport process, data signals that are embodied in carrier waves (transmitted over telephone lines, network lines, wireless links, cables, and the like) may communicate the code segments, including instructions, to the node. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system of indicating a message size, comprising:
a controller adapted to receive a first message containing a data portion and an indication of a size for the data portion,
the controller adapted to modify the indication to indicate a different size for the data portion.

2. The system of claim 1, wherein the controller is further adapted to determine a maximum size of data capable of being communicated along a downstream path, the controller modifying the indication based on the determination.

3. The system of claim 1, wherein the data portion size indication comprises a Transmission Control Protocol maximum segment size indication.

4. The system of claim 1, wherein the controller is further adapted to receive the first message from a client system over a local area network.

5. The system of claim 4, wherein the controller is further adapted to receive the first message from the client system over an Ethernet network.

6. The system of claim 1, wherein the first message comprises an Ethernet frame.

7. The system of claim 6, wherein the data portion of the Ethernet frame carries an Internet Protocol packet.

8. The system of claim 1, wherein the controller is further adapted to transmit a second message containing the modified indication.

9. The system of claim 8, wherein the first message comprises a first data portion and a first control portion, and wherein the second message comprises a second data portion and a second control portion, the second data portion carrying a control element not carried in the first data portion.

10. The system of claim 9, wherein the control element in the second data portion comprises a Point-to-Point Protocol control element.

11. The system of claim 9, wherein the control element in the second data portion comprises a Point-to-Point over Ethernet control element.

12. The system of claim 8, wherein the data portion size indication comprises a Transmission Control Protocol maximum segment size, wherein the maximum segment size in the first message indicates a length of 1,460 bytes and the maximum segment size in the second message indicates a length of 1,452 bytes.

13. The system of claim 1, wherein the controller is further adapted to modify the indication based on usage of a predetermined communications protocol.

14. The system of claim 13, wherein the predetermined communications protocol comprises a Point-to-Point over Ethernet protocol.

15. The system of claim 1, wherein the indication indicates a maximum size for the data portion.

16. The system of claim 1, wherein first message comprises a message to establish a connection between a first network element and a second network element, the message to establish the connection containing the indication of the size for the data portion,
wherein the controller is adapted to transmit a second message to establish the connection between the first network element and the second network element in response to the first message, the second message containing the modified indication.

17. The system of claim 16, wherein the controller is adapted to send the second message containing the modified indication to the second network element.

18. A method of indicating a message size performed by a system, comprising:
receiving, from a first network element, a first message to establish a connection between the first network element and a second network element, the first message containing an indication of a length of a data portion for messages to be communicated between the first and second network elements; and
adjusting a value of the indication to indicate a different length; and
sending a second message, to the second network element, to establish a connection between the first and second network elements, the second message containing the adjusted value of the indication.

19. The method of claim 18, wherein adjusting the value of the indication is based on a characteristic of a link between the system and another node.

20. The method of claim 19, wherein adjusting the value of the indication is based on a maximum message size supported by the link.

21. The method of claim 19, wherein adjusting the value of the indication is based on usage of a predetermined communications protocol in the link.

22. The method of claim 21, wherein adjusting the value of the indication is based on usage of a Point-to-Point over Ethernet protocol in the link.

23. The method of claim 18, wherein receiving the message comprises receiving a message having a Transmission Control Protocol maximum segment size.

24. The method of claim 18, wherein the indication indicates a maximum length of the data portion.

25. An article comprising at least one storage medium containing instructions for indicating a message size, the instructions when executed causing a system to:
- receive, from a first network element, a first message containing an indication of a size of a data portion for messages to be communicated between the first network element and a second network element;
- modify the indication to indicate a different size; and
- send a second message in response to the first message, the second message containing the modified indication.

26. The article of claim 25, wherein the indication comprises a TCP maximum segment size indication.

27. The article of claim 25, wherein the instructions when executed cause the system to determine the size of the data portion for messages supported by a communications path and to modify the indication based on the determination.

28. The article of claim 25, wherein the instructions when executed cause the system to modify the indication based on whether a predetermined communications protocol is employed in a communications path.

29. The article of claim 28, wherein the predetermined communications protocol comprises a Point-to-Point Protocol.

30. The article of claim 28, wherein the predetermined communications protocol comprises a Point-to-Point over Ethernet protocol.

31. The article of claim 25, wherein the instructions when executed cause the system to receive another response message having a size dependent on the modified indication.

32. The article of claim 25, wherein receiving the first message comprises receiving a first message to establish a session between the first and second network elements, and
- sending the second message containing the modified indication comprises a second message to establish the session between the first and second network elements.

33. The article of claim 32, wherein receiving the first message comprises receiving a first message containing a Transmission Control Protocol (TCP) SYN field set to an active state; and
- sending the second message comprises sending a second message containing the modified indication and a TCP SYN field set to an active state.

34. A data signal embodied in a carrier wave and containing instructions for indicating a message size, the instructions when executed causing a system to:
- receive a first message containing an indication of a length of a data portion for messages between first and second network elements; and
- adjust a value of the indication to indicate a different length; and
- send a second message in response to the first message, the second message containing the adjusted value of the indication.

35. A method of indicating a message size, comprising:
- receiving a message containing a maximum segment size value;
- determining a maximum data size supportable by a link between the system and another node;
- comparing the determined maximum data size with the maximum segment size value; and
- modifying the maximum segment size value based on the determination.

36. The method of claim 35, wherein comparing the determined maximum data size comprises computing a maximum segment size value and comparing the computed maximum segment size value with the maximum segment size value in the message.

37. The method of claim 35, further comprising sending a message containing the modified maximum segment size value over the link.

38. The method of claim 35, wherein receiving the message comprises receiving a message containing a Transmission Control Protocol header that contains the maximum segment size value.

39. An article comprising at least one storage medium containing instructions for indicating a message size, the instructions when executed causing a system to:
- receive a message containing a maximum segment size value;
- determine a maximum data size supportable by a link between the system and another node;
- compare the determined maximum data size with the maximum segment size value; and
- modify the maximum segment size value based on the determination.

40. A system for indicating a message size, comprising:
- means for receiving a message containing a maximum segment size value;
- means for determining a maximum data size supportable by a link between the system and another node;
- means for comparing the determined maximum data size with the maximum segment size value; and
- means for modifying the maximum segment size value based on the determination.

* * * * *